(12) United States Patent
Aoyama

(10) Patent No.: US 11,566,378 B2
(45) Date of Patent: Jan. 31, 2023

(54) FIBER ASSEMBLY-FORMING METHOD AND FIBER ASSEMBLY-FORMING APPARATUS

(71) Applicant: SEIKO EPSON CORPORATION, Tokyo (JP)

(72) Inventor: Tetsuya Aoyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/104,029

(22) Filed: Nov. 25, 2020

(65) Prior Publication Data

US 2021/0156091 A1      May 27, 2021

(30) Foreign Application Priority Data

Nov. 27, 2020   (JP) .............................. JP2019-214118

(51) Int. Cl.
| | |
|---|---|
| *D21H 23/20* | (2006.01) |
| *D01G 11/00* | (2006.01) |
| *D21H 17/36* | (2006.01) |
| *D21C 5/02* | (2006.01) |
| *D21H 17/26* | (2006.01) |
| *D21H 17/28* | (2006.01) |
| *D21H 11/14* | (2006.01) |
| *D21H 17/37* | (2006.01) |

(52) U.S. Cl.
CPC ............ *D21H 23/20* (2013.01); *D01G 11/00* (2013.01); *D21C 5/02* (2013.01); *D21H 11/14* (2013.01); *D21H 17/26* (2013.01); *D21H 17/28* (2013.01); *D21H 17/36* (2013.01); *D21H 17/375* (2013.01)

(58) Field of Classification Search
CPC ... B27N 1/02; B27N 3/18; B27N 3/04; D21H 17/26; D21H 23/20; D21H 17/36; D21H 11/14; D21H 17/375; D21H 17/28; Y02W 30/66; Y02W 30/64; D01G 11/00; D21C 5/02; D04H 1/732; D04H 1/64
USPC ...................................................... 162/164.6
See application file for complete search history.

(56) References Cited

U.S. PATENT DOCUMENTS

| | | |
|---|---|---|
| 8,882,965 B2 | 11/2014 | Yamagami et al. |
| 2015/0204015 A1 | 7/2015 | Gomi et al. |
| 2016/0193754 A1 | 7/2016 | Gomi et al. |
| 2017/0183814 A1 | 6/2017 | Murahara et al. |
| 2017/0203478 A1 | 7/2017 | Gomi et al. |

FOREIGN PATENT DOCUMENTS

| | | |
|---|---|---|
| CN | 104805721 A | 7/2015 |
| CN | 105940154 A | 9/2016 |
| JP | H11-293578 A | 10/1999 |
| JP | 2012-144826 A | 8/2012 |
| JP | 2014-084532 A | 5/2014 |
| JP | 2015-016589 A | 1/2015 |
| WO | 2016/203641 A1 | 12/2016 |

*Primary Examiner* — Mark Halpern
(74) *Attorney, Agent, or Firm* — Global IP Counselors, LLP

(57) ABSTRACT

A fiber assembly-forming method includes providing a water-soluble resin to a first feedstock containing fibers, forming disintegrated matter by disintegrating the first feedstock provided with the water-soluble resin, depositing the disintegrated matter, and providing water to the deposited disintegrated matter.

9 Claims, 4 Drawing Sheets

FIG. 8

| | EXAMPLE 1 | EXAMPLE 2 | EXAMPLE 3 | EXAMPLE 4 | EXAMPLE 5 | EXAMPLE 6 | COMPARATIVE EXAMPLE 1 |
|---|---|---|---|---|---|---|---|
| TYPE OF RESIN | WATER-SOLUBLE RESIN | | | | | | THERMOPLASTIC RESIN |
| | PVA | PVA | PVA | PAM | CMC | STARCH | POLYESTER |
| CONTENT OF RESIN WITH RESPECT TO RESIN | 0.5% BY MASS | 3.5% BY MASS | 10% BY MASS | 10% BY MASS | 10% BY MASS | 10% BY MASS | 10% BY MASS |
| PROCESS | WATER-PROVIDING WATER TEMPERATURE OF 80°C | WATER-PROVIDING WATER TEMPERATURE OF 80°C | WATER-PROVIDING WATER TEMPERATURE OF 80°C | WATER-PROVIDING WATER TEMPERATURE OF 80°C | WATER-PROVIDING WATER TEMPERATURE OF 80°C | WATER-PROVIDING WATER TEMPERATURE OF 80°C | HEATING 180°C |
| HEAT RESISTANCE | A | A | A | A | A | A | B |

FIBER ASSEMBLY-FORMING METHOD AND FIBER ASSEMBLY-FORMING APPARATUS

The present application is based on, and claims priority from JP Application Serial Number 2019-214118, filed Nov. 27, 2019, the disclosure of which is hereby incorporated by reference herein in its entirety.

BACKGROUND

1. Technical Field

The present disclosure relates to fiber assembly-forming method and a fiber assembly-forming apparatus.

2. Related Art

Dry fiber assembly-forming apparatuses using substantially no water for the purpose of size reduction and energy saving have been proposed.

For example, JP-A-2015-16589 describes that a fiber assembly is obtained in such a manner that natural fibers and thermoplastic resin fibers are mixed together and are fed to an air-lay machine, a web is formed by depositing the fibers on a conveyer, and the thermoplastic resin fibers are melted and are then solidified.

However, when a fiber assembly obtained by melting and solidifying thermoplastic resin fibers as described above is exposed to a high-temperature environment, the solidified thermoplastic resin fibers are melted in some cases. Therefore, the fiber assembly curls or wrinkles.

SUMMARY

According to an aspect of the present disclosure, a fiber assembly-forming method includes a step of providing a water-soluble resin to a first feedstock containing fibers, a step of forming disintegrated matter by disintegrating the first feedstock provided with the water-soluble resin, a step of depositing the disintegrated matter, and a step of providing water to the deposited disintegrated matter.

In the fiber assembly-forming method, in the step of providing the water-soluble resin, the water-soluble resin may be provided to a surface of the first feedstock.

In the fiber assembly-forming method, the mass of the water provided in the step of providing the water may be one-hundredth times to 100 times the mass of the water-soluble resin provided in the step of providing the water-soluble resin.

In the fiber assembly-forming method, the temperature of the water provided in the step of providing the water may be 40° C. to 200° C.

In the fiber assembly-forming method, in the step of forming the disintegrated matter, the first feedstock provided with the water-soluble resin and a second feedstock unprovided with the water-soluble resin may be disintegrated.

According to an aspect of the present disclosure, a fiber assembly-forming method includes a step of preparing a wet web and a step of providing a water-soluble resin to the wet web.

In the fiber assembly-forming method, the step of preparing the wet web may include a substep of forming disintegrated matter by disintegrating a feedstock containing fibers, a substep of depositing the disintegrated matter, and a substep of providing water to the deposited disintegrated matter.

According to an aspect of the present disclosure, a fiber assembly-forming method includes a step of preparing material containing fibers and a water-soluble resin, a step of forming disintegrated matter by disintegrating the material, a step of depositing the disintegrated matter, and a step of providing water to the deposited disintegrated matter. In the step of preparing the material, the material is prepared such that the water-soluble resin accounts for 0.5% by mass or more of the fibers.

In the fiber assembly-forming method, in the step of preparing the material, the material may be prepared such that the water-soluble resin accounts for 3.5% by mass or more of the fibers.

In the fiber assembly-forming method, in the step of preparing the material, the material may contain a resinous substance made of the water-soluble resin.

In the fiber assembly-forming method, the water-soluble resin may have remoistening properties.

According to an aspect of the present disclosure, a fiber assembly-forming method includes a step of preparing disintegrated matter containing disintegrated fibers, a step of preparing a powdery water-soluble resin, a step of forming a mixture by mixing the disintegrated matter and the powdery water-soluble resin together, a step of depositing the mixture, and a step of providing moisture to the deposited mixture.

According to an aspect of the present disclosure, a fiber assembly-forming apparatus includes a resin-providing section providing a water-soluble resin to a first feedstock containing fibers, a disintegration section disintegrating the first feedstock provided with the water-soluble resin to form disintegrated matter, a deposition section depositing the disintegrated matter, and a water-providing portion providing water to the deposited disintegrated matter.

In the fiber assembly-forming apparatus, the disintegration section may disintegrate the first feedstock provided with the water-soluble resin and a second feedstock unprovided with the water-soluble resin.

In the fiber assembly-forming apparatus, the water-soluble resin may have remoistening properties.

BRIEF DESCRIPTION OF THE DRAWINGS

FIG. 8 is a table showing evaluation results of heat resistance.

DESCRIPTION OF EXEMPLARY EMBODIMENTS

Preferred embodiments of the present disclosure will now be described in detail with reference to the accompanying drawings. The embodiments below do not unfairly limit the scope of the present disclosure that is recited in the claims. All of components described below are not necessarily essential elements of the present disclosure.

1. FIBER ASSEMBLY-FORMING APPARATUS

1.1. Overall Configuration

Figure 1:
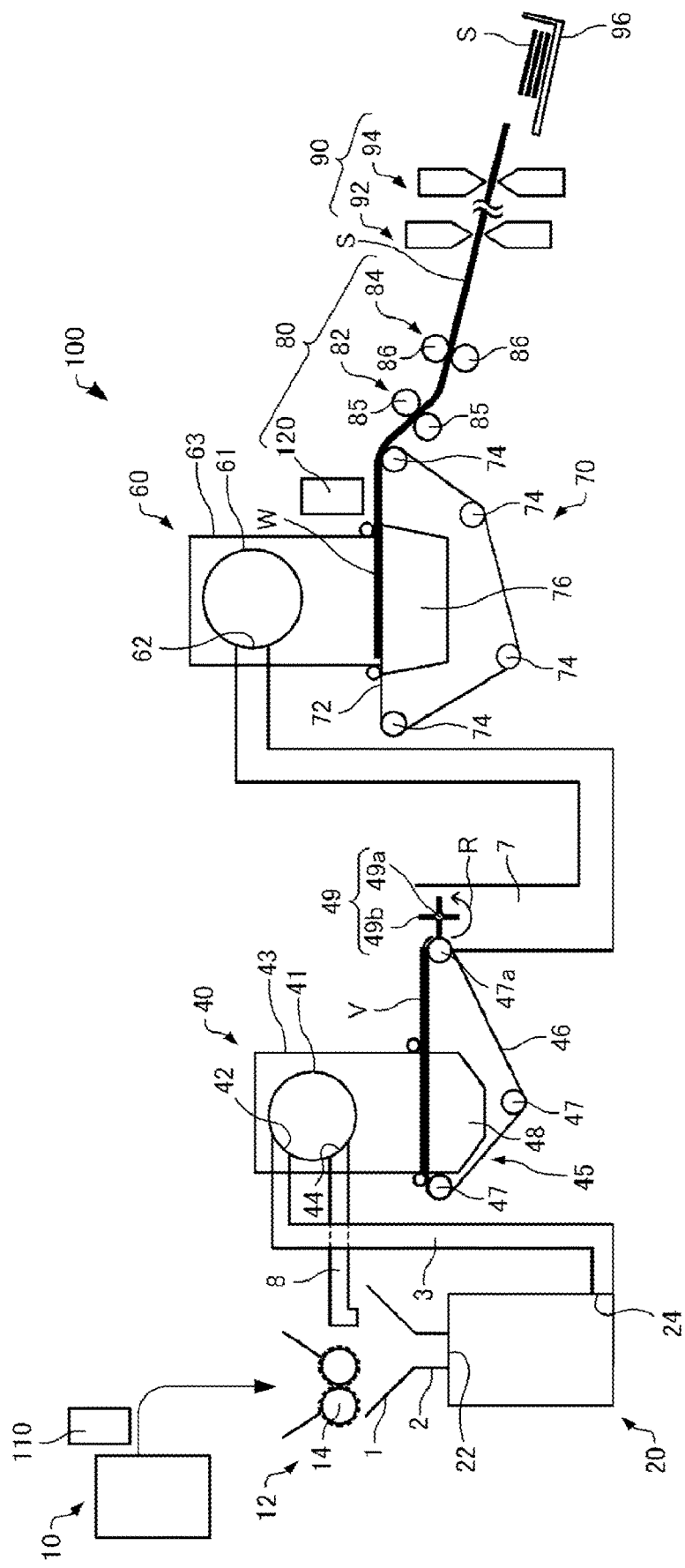
FIG. 1 is a schematic view of a fiber assembly-forming apparatus according to an embodiment of the present disclosure.

A fiber assembly-forming apparatus 100 according to an embodiment of the present disclosure is described with reference to a drawing. FIG. 1 is a schematic view of the fiber assembly-forming apparatus 100.

As shown in FIG. 1, the fiber assembly-forming apparatus 100 includes, for example, a supply section 10, a rough crushing section 12, a disintegration section 20, a screening section 40, a first web-forming section 45, a rotator 49, a deposition section 60, a second web-forming section 70, a sheet-forming section 80, a cutting section 90, and a resin-providing section 110.

The supply section 10 supplies a feedstock to the rough crushing section 12. The supply section 10 is, for example, an automatic input section for continuously inputting the feedstock to the rough crushing section 12. The feedstock supplied by the supply section 10 contains, for example, fibers of waste paper, pulp sheets, or the like.

The resin-providing section 110 provides a water-soluble resin to the feedstock supplied from the supply section 10. Details of the resin-providing section 110 are described below.

The rough crushing section 12 cuts the feedstock supplied by the supply section 10 into small pieces in gas such as air. The small pieces are, for example, several centimeters square pieces. In an illustrated example, the rough crushing section 12 includes rough crushing blades 14 and can cut the input feedstock with the rough crushing blades 14. The rough crushing section 12 used is, for example, a shredder. The feedstock cut by the rough crushing section 12 is received in a hopper 1 and is then transferred to the disintegration section 20 through a pipe 2.

The disintegration section 20 disintegrates the feedstock cut by the rough crushing section 12. The term "disintegrate" as used herein means that a feedstock containing a plurality of bound fibers is disentangled into the fibers one by one. The disintegration section 20 has the function of removing substances, such as resin particles, ink, toner, and a bleeding inhibitor, adhering to the feedstock from fibers.

One having passed through the disintegration section 20 is referred to as "disintegrated matter". The "disintegrated matter" contains disentangled disintegrated fibers and also contains resin particles separated from fibers when the fibers are disintegrated, a colorant such as ink or toner, or an additive such as a bleeding inhibitor or a paper strength additive in some cases. Disentangled disintegrated matter is string-shaped. The disentangled disintegrated matter may be present in such a state that the disentangled disintegrated matter is not intertwined with other disentangled fibers, that is, such a state that the disentangled disintegrated matter is independent or in such a state that the disentangled disintegrated matter is intertwined with other disentangled fibers to form aggregates, that is, such a state that the disentangled disintegrated matter forms lumps.

The disintegration section 20 performs disintegration in a dry mode. Herein, performing treatment such as disintegration in gas, such as air, rather than liquid is referred to as a dry mode. The disintegration section 20 used is, for example, an impeller mill. The disintegration section 20 has the function of generating such an air flow that sucks the feedstock and discharges the disintegrated matter. This enables the disintegration section 20 to suck the feedstock from an inlet 22 by means of an air flow generated by the disintegration section 20 together with the air flow, to disintegrate the feedstock, and to transport the disintegrated matter to an outlet 24. The disintegrated matter having passed through the disintegration section 20 is transferred to the screening section 40 through a pipe 3. Incidentally, an air flow for transporting the disintegrated matter from the disintegration section 20 to the screening section 40 may be the air flow generated by the disintegration section 20 or an air flow generated by an air flow generator such as a blower.

The screening section 40 imports the disintegrated matter having passed through the disintegration section 20 from an inlet 42 and screens the disintegrated matter depending on the length of fibers. The screening section 40 includes a drum portion 41 and a housing portion 43 that houses the drum portion 41. The drum portion 41 used is, for example, a sieve. The drum portion 41 includes a net and can separate fibers or particles smaller than the size of openings of the net, that is, first screened fractions passing through the net, and fibers, undisintegrated pieces, or lumps larger than the size of the openings of the net, that is, second screened fractions not passing through the net. For example, the first screened fractions are transferred to the deposition section 60 through a pipe 7. The second screened fractions are returned to the disintegration section 20 from an outlet 44 through a pipe 8. In particular, the drum portion 41 is a cylindrical sieve rotationally driven with a motor. The net of the drum portion 41 used is, for example, a metal gauze, an expanded metal obtained by expanding a slit metal plate, or a punching metal obtained by forming holes in a metal plate with a press or the like.

The first web-forming section 45 transports the first screened fractions having passed through the screening section 40 to the pipe 7. The first web-forming section 45 includes a mesh belt 46, tension rollers 47, and a suction mechanism 48.

The suction mechanism 48 can suck the first screened fractions which have passed through openings of the screening section 40 and which have been distributed in air onto the mesh belt 46. The first screened fractions are deposited on the moving mesh belt 46 to form a web V. The basic configuration of the mesh belt 46, the tension rollers 47, and the suction mechanism 48 is substantially the same as that of a mesh belt 72, tension rollers 74, and suction mechanism 76 of the second web-forming section 70 as described below.

The web V passes through the screening section 40 and the first web-forming section 45 and is thereby formed in such a state that the web V contains a lot of air, is soft, and is bulgy. The web V deposited on the mesh belt 46 is input to the pipe 7 and is transported to the deposition section 60.

The rotator 49 can cut the web V. In the illustrated example, the rotator 49 includes a base portion 49a and protruding portions 49b protruding from the base portion 49a. The protruding portions 49b have, for example, a plate shape. In the illustrated example, the number of the protruding portions 49b is four and the four protruding portions 49b are arranged at equal intervals. The base portion 49a rotates in a direction R and therefore the protruding portions 49b can rotate about the base portion 49a. For example, the change in amount of the disintegrated matter supplied to the deposition section 60 per unit time can be reduced in such a manner that the web V is cut by the rotator 49.

The rotator 49 is placed in the vicinity of the first web-forming section 45. In the illustrated example, the rotator 49 is placed in the vicinity of a tension roller 47a located downstream in the path of the web V. The rotator 49 is placed at a position where the protruding portions 49b can come into contact with the web V and do not come into contact with the mesh belt 46, on which the web V is deposited. This enables the mesh belt 46 to be inhibited from being worn by the protruding portions 49b. The shortest distance between the protruding portions 49b and the mesh belt 46 is, for example, 0.05 mm to 0.5 mm. This is the distance that the web V can be cut without damaging the mesh belt 46.

The deposition section 60 imports the first screened fractions from an inlet 62, disentangles the intertwined disintegrated matter, and sprays the intertwined disintegrated matter in air so as to be dispersed. The deposition section 60 can uniformly deposit the first screened fractions on the second web-forming section 70.

The deposition section 60 includes a drum portion 61 and a housing portion 63 that houses the drum portion 61. The drum portion 61 used is, for example, a rotary cylindrical sieve. The drum portion 61 includes a net and sprays fibers or particles smaller than the size of openings of the net. The configuration of the drum portion 61 is the same as, for example, the configuration of the drum portion 41.

Incidentally, the "sieve" of the drum portion 61 need not have the function of screening a specific target. That is, the "sieve" used as the drum portion 61 means one equipped with a net. The drum portion 61 may spray all of the disintegrated matter imported in the drum portion 61.

The second web-forming section 70 deposits a passing object having passed through the deposition section 60 to form a web W. The second web-forming section 70 includes, for example, a mesh belt 72, tension rollers 74, and a suction mechanism 76.

The mesh belt 72 allows the passing object having passed through an opening of the deposition section 60 to be deposited thereon while moving. The mesh belt 72 is tensioned by the tension rollers 74 and is configured such that the passing object is unlikely to pass through the mesh belt 72 and air passes through the mesh belt 72. The mesh belt 72 moves because the tension rollers 74 rotate. The passing object having passed through the deposition section 60 is deposited on the mesh belt 72 that is continuously moving, whereby the web W is formed on the mesh belt 72.

The suction mechanism 76 is placed under the mesh belt 72. The suction mechanism 76 can generate an air flow directed downward. The disintegrated matter dispersed in air by the deposition section 60 can be sucked on the mesh belt 72 by the suction mechanism 76. This enables the discharge rate from the deposition section 60 to be increased. Furthermore, a down-flow can be formed in the fall path of the disintegrated matter by the suction mechanism 76, thereby enabling the disintegrated matter and an additive to be prevented from being intertwined during falling.

As described above, passing through the deposition section 60 and the second web-forming section 70 allows the web W to be formed in such a state that the web W contains a lot of air, is soft, and is bulgy. The web W deposited on the mesh belt 72 is transported to the sheet-forming section 80.

After the sheet-forming section 80 provides water to the web W deposited on the mesh belt 72, the sheet-forming section 80 pressurizes and heats the web W. This allows a sheet S to be formed. In the sheet-forming section 80, water is provided to a mixture of the disintegrated matter and water-soluble resin mixed together in the web W, thereby enabling a plurality of fibers in the mixture to be bound to each other with the water-soluble resin.

The sheet-forming section 80 includes a water-providing portion 120 providing water to the web W, a pressurizing portion 82 pressurizing the web W provided with water, and a heating portion 84 heating the web W pressurized by the pressurizing portion 82. Details of the water-providing portion 120 are described below.

The pressurizing portion 82 is composed of a pair of calendar rollers 85 and applies a pressure to the web W. Pressurizing the web W reduces the thickness of the web W and increases the bulk density of the web W.

The heating portion 84 heats the web W to dry the web W. When the amount of water provided from the water-providing portion 120 is small and the web W need not be dried, the heating portion 84 need not be used. The web W may be naturally dried. In this case, the heating portion 84 need not be used.

The heating portion 84 used is, for example, a heating roller, a hot press molding machine, a hotplate, a hot air blower, an infrared heater, or a flash-fusing system. In the illustrated example, the heating portion 84 includes a pair of heating rollers 86. The calendar rollers 85 and the heating rollers 86 are arranged such that, for example, the axes of rotation thereof are parallel. The calendar rollers 85 can apply a higher pressure to the web W than the pressure applied to the web W by the heating rollers 86.

The cutting section 90 cuts the sheet S formed by the sheet-forming section 80. In the illustrated example, the cutting section 90 includes a first cutting portion 92 cutting the sheet S in a direction crossing the transport direction of the sheet S and a second cutting portion 94 cutting the sheet S in a direction parallel to the transport direction thereof. The second cutting portion 94 cuts the sheet S having passed through, for example, the first cutting portion 92.

The above allows the sheet S to be formed such that the sheet S is a single sheet with a predetermined size. The cut sheet S, which is such a single sheet, is discharged to a discharge section 96.

1.2. Resin-Providing Section

The resin-providing section 110 provides the water-soluble resin to the feedstock, which contain the fibers. The water-soluble resin is a binding material for bonding the fibers to each other. The feedstock, which contain the fibers, is, for example, waste paper. In the illustrated example, the resin-providing section 110 provides the water-soluble resin to the feedstock, supplied from the supply section 10, roughly uncrushed by the rough crushing section 12.

The resin-providing section 110 may provide a powdery water-soluble resin or a liquid containing the water-soluble resin. The resin-providing section 110 preferably provides the powdery water-soluble resin. If the resin-providing section 110 provides the powdery water-soluble resin to the feedstock, the feedstock can be prevented from being bonded to the rough crushing section 12 or the disintegration section 20 with the powdery water-soluble resin, because the powdery water-soluble resin has no adhesion properties at the point in time when the powdery water-soluble resin is provided to the feedstock. Although the liquid containing the water-soluble resin has high viscosity and therefore the viscosity thereof needs to be adjusted, the powdery water-soluble resin can be readily provided to the feedstock without taking these facts into account.

The resin-providing section 110 may provide the water-soluble resin to a surface of the feedstock. The resin-providing section 110 may include a roller providing the water-soluble resin to the feedstock. Alternatively, the resin-providing section 110 may include a spray providing the water-soluble resin to the feedstock.

The water-soluble resin, which is provided from the resin-providing section 110, has adhesion properties after water is provided to the water-soluble resin. Examples of the water-soluble resin include polyvinyl alcohol, polyacrylamide, polyacrylic acid, polyacrylates, alginic acid, polyvinyl ether, cellulose derivatives, processed starches, glue, and casein. Examples of the cellulose derivatives include methylcellulose, carboxymethylcellulose, and hydroxyethylcellulose.

The water-soluble resin, which is provided from the resin-providing section 110, preferably has remoistening properties. When the water-soluble resin has remoistening properties, the formed sheet S can be reused without providing the water-soluble resin again. The term "remoistening properties" refers to resin properties that can reproduce adhesion properties in such a manner that, after water is provided to resin having adhesion properties once and is the resin is dried, a solvent such as water is provided to the resin again. Examples of a water-soluble resin having remoistening properties include polyvinyl alcohol, polyacrylamide, polyacrylic acid, alginic acid, methylcellulose, carboxymethylcellulose, hydroxyethylcellulose, processed starch, and glue.

The resin-providing section 110 provides the water-soluble resin to the feedstock such that the water-soluble resin accounts for 0.5% by mass or more of the fibers, preferably 3.5% by mass to 30% by mass. When the water-soluble resin accounts for 0.5% by mass or more of the fibers, the sheet S can be formed so as to have high paper strength. When the water-soluble resin accounts for 30% by mass or less of the fibers, a sheet formed with an excess of the water-soluble resin can be prevented from becoming transparent.

1.3. Water-Providing Portion

The water-providing portion 120 provides water to the deposited disintegrated matter (web W). The provided water allows the water-soluble resin to have adhesion properties. The fibers in the disintegrated matter are bonded to each other by the water-soluble resin having adhesion properties.

The water-providing portion 120 is not particularly limited and may provide water to the disintegrated matter. The water-providing portion 120 is, for example, a spray or the like. Examples of the water provided from the water-providing portion 120 include pure water products such as ion-exchanged water, ultrafiltered water, reverse osmosis-purified water, and distilled water and ultrapure water, which is substantially free from impurities.

The mass of the water provided from the water-providing portion 120 is, for example, one-hundredth times to 100 times the mass of the water-soluble resin provided from the resin-providing section 110. When the mass of the water is one-hundredth or more times the mass of the water-soluble resin, the water can be sufficiently provided to the water-soluble resin and the water-soluble resin can have adhesion properties. When the mass of the water is 100 or less times the mass of the water-soluble resin, the reduction of the bonding force between the fibers due to the shortage of the water-soluble resin can be prevented.

The water may be in any of a gas state, a liquid state, a supercritical state, and a super-heated steam state. The temperature of the water is preferably 40° C. to 200° C. When the temperature of the water is 40° C. or higher, the adhesion force due to the water-soluble resin can be increased. When the temperature of the water is 200° C. or lower, the fibers can be prevented from being discolored by the heat of the water.

The water-providing portion 120 preferably provides water to the disintegrated matter unpressurized by the pressurizing portion 82. This enables the pressurizing portion 82 to pressurize the disintegrated matter containing the water-soluble resin which is provided with water and which has adhesion properties and enables the sheet-forming section 80 to form the sheet S such that the sheet S has a desired thickness.

1.4. Effects

The fiber assembly-forming apparatus 100 has, for example, effects below.

The fiber assembly-forming apparatus 100 includes the resin-providing section 110, which provides the water-soluble resin to the feedstock containing the fibers; the disintegration section 20, which disintegrates the feedstock provided with the water-soluble resin to form the disintegrated matter; the deposition section 60, which deposits the disintegrated matter; and the water-providing portion 120, which provides water to the deposited disintegrated matter. In the fiber assembly-forming apparatus 100, the fibers are not bonded to each other by melting and solidifying a thermoplastic resin but are bonded to each other by adhesion properties of the water-soluble resin provided with water as described above. Therefore, even if the formed sheet S is exposed to a high-temperature environment, resin is unlikely to be melted. Thus, the sheet S (fiber assembly) can be formed so as to be unlikely to curl and wrinkle.

Furthermore, in the fiber assembly-forming apparatus 100, the disintegration section 20 has the function of mixing the feedstock and the water-soluble resin together. Therefore, even if the water-soluble resin is unevenly distributed at the point in time when the water-soluble resin is provided to the feedstock, the uneven distribution of the water-soluble resin can be reduced by the disintegration section 20 and the sheet S can be formed so as to have little variation in paper strength. Furthermore, since a mixing section mixing the feedstock and the water-soluble resin together is not necessary, the downsizing of an apparatus is possible.

2. FIBER ASSEMBLY-FORMING METHOD

Figure 2:
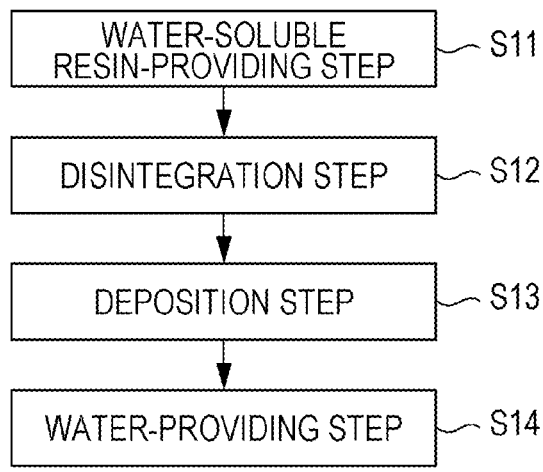
FIG. 2 is a flowchart illustrating a fiber assembly-forming method according to an embodiment of the present disclosure.

Next, a fiber assembly-forming method according to an embodiment of the present disclosure is described with reference to a drawing. FIG. 2 is a flowchart illustrating the fiber assembly-forming method.

The fiber assembly-forming method is performed using, for example, the above-mentioned fiber assembly-forming apparatus 100. The fiber assembly-forming method may be performed using an apparatus other than the fiber assembly-forming apparatus 100.

As shown in FIG. 2, the fiber assembly-forming method includes a water-soluble resin-providing step (Step S11) of providing a water-soluble resin to a feedstock containing fibers, a disintegration step (Step S12) of forming disintegrated matter by disintegrating the feedstock provided with the water-soluble resin, a deposition step (Step S13) of depositing the disintegrated matter, and a water-providing step (Step S14) of providing water to the deposited disintegrated matter.

The water-soluble resin-providing step (Step S11) is performed using, for example, the resin-providing section 110 of the fiber assembly-forming apparatus 100.

The disintegration step (Step S12) is performed using, for example, the disintegration section 20 of the fiber assembly-forming apparatus 100.

The deposition step (Step S13) is performed using, for example, the deposition section 60 of the fiber assembly-forming apparatus 100.

The water-providing step (Step S14) is performed using, for example, the water-providing portion 120 of the fiber assembly-forming apparatus 100.

The fiber assembly-forming method may include, for example, a step such as a step of pressurizing the web W by the pressurizing portion 82 or a step of heating the web W by the heating portion 84 as described in above-mentioned "1. Fiber Assembly-Forming Apparatus" in addition to the above steps.

In the fiber assembly-forming method, the sheet S can be formed so as to be unlikely to curl and wrinkle as described in above-mentioned "1. Fiber Assembly-Forming Apparatus".

Figure 3:
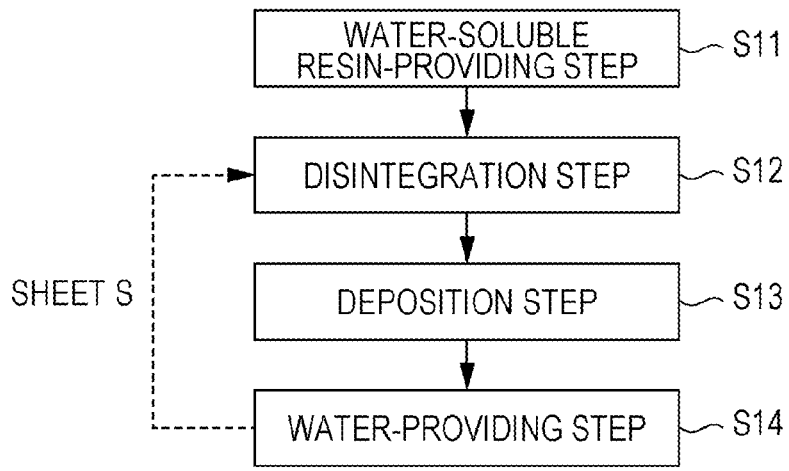
FIG. 3 is a flowchart illustrating the fiber assembly-forming method.

In an example shown in FIG. 2, in the disintegration step, the feedstock provided with the water-soluble resin in the water-soluble resin-providing step is disintegrated. As shown in FIG. 3, in the disintegration step, the feedstock (first feedstock) provided with the water-soluble resin in the water-soluble resin-providing step and the sheet S formed through the water-providing step may be disintegrated. In an example shown in FIG. 3, the sheet S is a feedstock (second feedstock) unprovided with the water-soluble resin. The disintegration section 20 may disintegrate the first feedstock and the second feedstock. The term "feedstock unprovided with the water-soluble resin" as used herein refers to material which is a sheet, formed through the water-providing step, unprovided with the water-soluble resin in the water-soluble resin-providing step.

Figure 4:
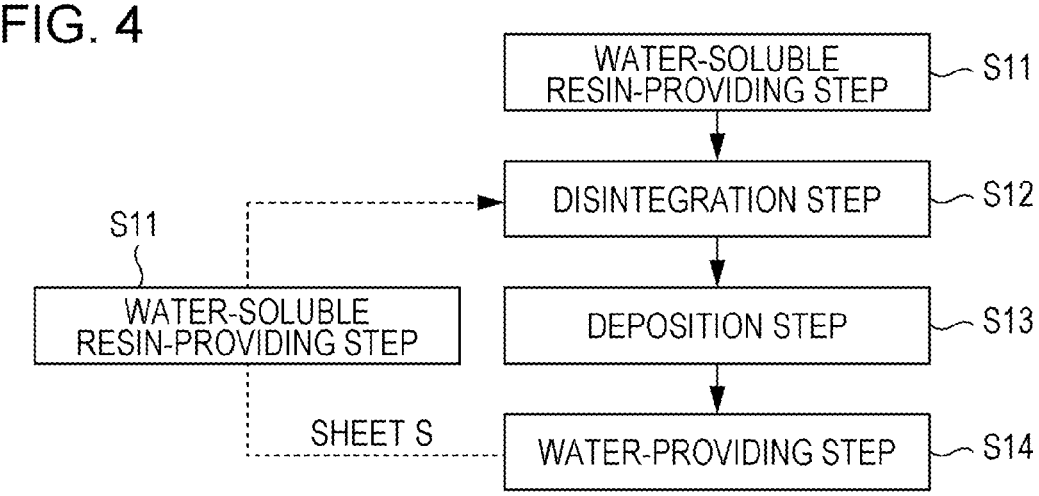
FIG. 4 is a flowchart illustrating the fiber assembly-forming method.

As shown in FIG. 4, in the disintegration step, the feedstock provided with the water-soluble resin in the water-soluble resin-providing step and the sheet S, formed through the water-providing step, provided with the water-soluble resin in the water-soluble resin-providing step may be disintegrated.

3. MODIFICATIONS OF FIBER ASSEMBLY-FORMING METHOD

3.1. First Modification

Figure 5:
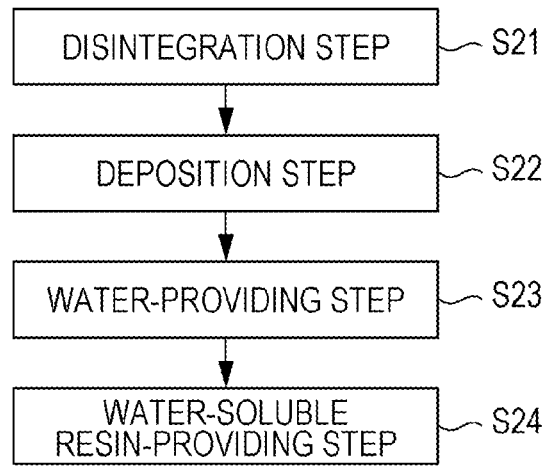
FIG. 5 is a flowchart illustrating a first modification of the fiber assembly-forming method.

Next, a first modification of the fiber assembly-forming method is described with reference to a drawing. FIG. 5 is a flowchart illustrating the first modification.

Hereinafter, in the first modification, what is different from the fiber assembly-forming method is described and what is common to the fiber assembly-forming method is not described. This applies to a second modification of the fiber assembly-forming method that is described below.

In the fiber assembly-forming method, after the water-soluble resin-providing step (Step S11) is performed, the water-providing step (Step S14) is performed as shown in FIG. 2.

However, in the first modification, after a water-providing step (Step S23) is performed, a water-soluble resin-providing step (Step S24) is performed as shown in FIG. 5.

The first modification includes a wet web-preparing step of preparing a wet web. As shown in FIG. 5, the wet web-preparing step includes a disintegration substep (Step S21) of forming disintegrated matter by disintegrating a feedstock containing fibers, a deposition substep (Step S22) of depositing the disintegrated matter, and a water-providing substep (Step S23) of providing water to the deposited disintegrated matter. As shown in FIG. 5, the first modification further includes a water-soluble resin-providing step (Step S24) of providing a water-soluble resin to the deposited wet web.

The disintegration substep (Step S21) is substantially the same as the above-mentioned disintegration step (Step S12). The deposition substep (Step S22) is substantially the same as the above-mentioned deposition step (Step S13). The water-providing substep (Step S23) is substantially the same as the above-mentioned water-providing step (Step S14). The water-soluble resin-providing step (Step S24) is substantially the same as the above-mentioned water-soluble resin-providing step (Step S11).

In the first modification, as well as the fiber assembly-forming method, a sheet S can be formed so as to be unlikely to curl and wrinkle.

Incidentally, the wet web-preparing step of preparing the wet web is not limited to an example shown in FIG. 5 and may be such that the wet web can be prepared using, for example, a general papermaking technique. In the wet web-preparing step, the wet web may be prepared in such a manner that the feedstock is disintegrated using, for example, water. The "wet web" is a fiber assembly containing a plurality of fibers containing water and is such that the ratio of the mass of water to the mass of dry fibers is 20% to 80%.

3.2. Second Modification

Figure 6:
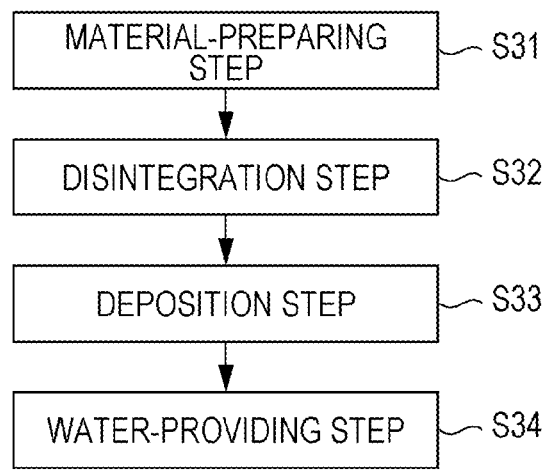
FIG. 6 is a flowchart illustrating a second modification of the fiber assembly-forming method.

Next, the second modification is described with reference to a drawing. FIG. 6 is a flowchart illustrating the second modification.

As shown in FIG. 2, the fiber assembly-forming method includes the water-soluble resin-providing step (Step S11). As shown in FIG. 6, the second modification includes a material-preparing step (Step S31) of preparing material containing fibers and a water-soluble resin.

As shown in FIG. 6, the second modification includes the material-preparing step (Step S31), a disintegration step (Step S32) of forming disintegrated matter by disintegrating the material, a deposition step (Step S33) of depositing the disintegrated matter, and a water-providing step (Step S34) of providing water to the deposited disintegrated matter.

In the material-preparing step (Step S31), the material contains, for example, waste paper and a resinous substance made of the water-soluble resin.

The shape of the resinous substance is not particularly limited and is, for example, a sheet shape (single sheet shape), a strip shape formed by fragmenting a single sheet, a dice shape, or a spherical shape. The resinous substance is preferably a sheet-shaped resin sheet. When the resinous substance is such a resin sheet, the resinous substance can be supplied by attaching a sheet-feeding stacker for supplying the resinous substance to the supply section 10 of the fiber assembly-forming apparatus 100. In the material-preparing step, the same number of resin sheets as that of sheets of waste paper may be prepared. In a case where the second modification is performed using the fiber assembly-forming apparatus 100, the resin-providing section 110 need not be driven. Alternatively, the resin-providing section 110 need not be used.

In the material-preparing step, the material is prepared such that the water-soluble resin accounts for 0.5% by mass or more of the fibers. In a case where, for example, waste paper and the resinous substance are prepared as material, supposing that the mass of fibers contained in the waste paper is 100, the sum of the mass of the water-soluble resin contained in the waste paper and the mass of the resinous substance is 0.5 or more. In the material-preparing step, the material is preferably prepared such that the water-soluble resin accounts for 3.5% by mass or more of the fibers. When the material is such that the water-soluble resin accounts for 0.5% by mass or more of the fibers, the sheet S can be formed so as to have high paper strength.

The disintegration step (Step S32) is substantially the same as the above-mentioned disintegration step (Step S12). The deposition step (Step S33) is substantially the same as the above-mentioned deposition step (Step S13). The water-providing step (Step S34) is substantially the same as the above-mentioned water-providing step (Step S14).

The second modification has, for example, effects below.

In the second modification, as well as the fiber assembly-forming method, the sheet S can be formed so as to be unlikely to curl and wrinkle.

In the second modification, no water-soluble resin-providing step is performed unlike the fiber assembly-forming method; hence, for example, the resin-providing section 110 of the fiber assembly-forming apparatus 100 can be omitted. Therefore, the downsizing of the fiber assembly-forming apparatus 100 is possible.

In the second modification, in the material-preparing step, the material may contain a resinous substance made of the water-soluble resin. For example, a sheet-shaped resinous substance is easy in stock control and has good operation efficiency. Furthermore, the type of the resinous substance can be selected without being restricted by crushability, powder characteristics such as fluidity, dispersibility, dischargibility, storage stability, or compatibility.

Furthermore, a plurality of different functional agents can be provided to the fibers depending on purposes in such a manner that a flame retardant, an antistatic agent, an ultraviolet absorber, a perfume, and the like are added to the resinous substance; hence, functional customization is easy.

Figure 7:
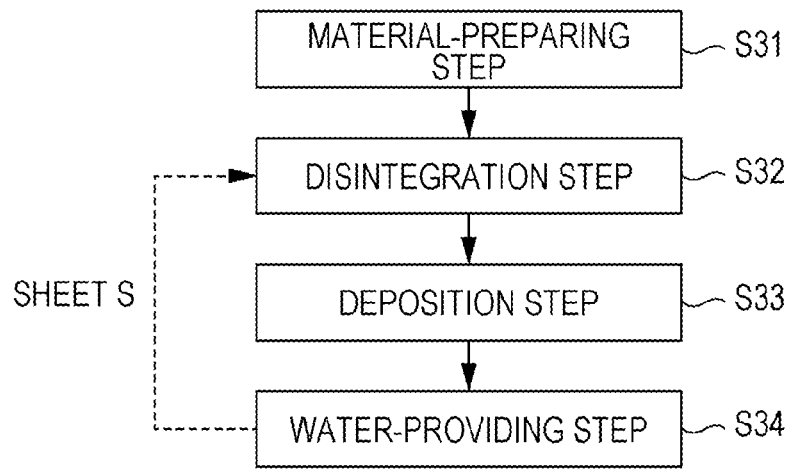
FIG. 7 is a flowchart illustrating the second modification of the fiber assembly-forming method.

In the second modification, if the material can be prepared in the material-preparing step such that the water-soluble resin accounts for 0.5% by mass or more of the fibers, the sheet S, which is formed through the water-providing, may be prepared as material in addition to the waste paper and the resinous substance as shown in FIG. 7.

In the second modification, if the material can be prepared in the material-preparing step such that the water-soluble resin accounts for 0.5% by mass or more of the fibers, the waste paper and the sheet S may be prepared as material without preparing the resinous substance or the sheet S only may be prepared. For example, a sheet S formed by providing a water-soluble resin having remoistening properties in the water-soluble resin-providing step contains the remoistening water-soluble resin. In a case where this sheet S is used as material, the fibers can be bonded to each other with the remoistening water-soluble resin contained in this sheet S without providing the water-soluble resin again.

In the second modification, the material-preparing step may include a substep of preparing disintegrated matter containing disintegrated fibers and a substep of preparing a powdery water-soluble resin. In this case, the material-preparing step may include a mixing substep of mixing the disintegrated matter and the powdery water-soluble resin together to form a mixture without performing the disintegration step after the material-preparing step. In the deposition step, the mixture formed in the mixing substep may be deposited. In the water-providing step, moisture may be provided to the mixture deposited in the deposition step.

4. EXAMPLES AND COMPARATIVE EXAMPLE 4.1. Preparation of Samples 4.1.1. Examples 1 to 6

A water-soluble resin was provided to recycled paper, G80 (a basis weight of 64 g/m$^2$), available from Mitsubishi Paper Mills, Ltd., whereby a feedstock was prepared. After the feedstock was disintegrated and deposited using a modification of a papermaking machine, PaperLab A8000, available from Seiko Epson Corporation, water was provided to deposited disintegrated matter, whereby fibers were bonded to each other. The ratio of the mass of water to the mass of the provided water-soluble resin in the feedstock was 10. In Examples 1 to 6, the type of the water-soluble resin, the content of the water-soluble resin with respect to the fibers, and the temperature of provided water were varied as shown in FIG. 8. A sheet was prepared in each of Examples 1 to 6 as described above.

In FIG. 8, "PVA" is polyvinyl alcohol, KURARAY POVAL PVA-210, available from Kuraray Co., Ltd.; "PAM" is polyacrylamide, Polystron 705, available from Arakawa Chemical Industries, Ltd.; "CMC" is carboxymethylcellulose, CMC Daicel 1120, available from Daicel FineChem, Ltd.; starch is gelatinized starch, M-350, available from Sansho Co., Ltd.; and polyester is VYLON 220 (a glass transition point of 54° C. and a softening temperature of 96° C.) available from Toyobo Co., Ltd.

4.1.2. Comparative Example 1

In Comparative Example 1, a sheet was prepared in substantially the same manner as that used in Examples 1 to 6 except that a thermoplastic resin was provided instead of the water-soluble resin and fibers were bonded to each other in such a manner that the thermoplastic resin was melted by heating the thermoplastic resin to 180° C. instead of providing water.

4.2. Evaluation

The sheets prepared as described above were evaluated for heat resistance. In particular, whether each sheet became deformed (curled) or whether the sheet wrinkled when the sheet was heated to 130° C. was visually evaluated. Evaluation results of heat resistance were as shown in FIG. 8.

Evaluation standards were as described below.
A: No deformation or wrinkle was observed.
B: A deformation and a wrinkle were observed.

As shown in FIG. 8, the sheets provided with the water-soluble resin in Examples 1 to 6 did not become deformed or wrinkle. However, the sheet provided with the thermoplastic resin in Comparative Example 1 became deformed and wrinkled. From the above, it was clear that a sheet containing fibers bonded to each other with a water-soluble resin was unlikely to become deformed and was unlikely to wrinkle in a high-temperature environment as compared to a sheet containing fibers bonded to each other with a thermoplastic resin.

In the present disclosure, configurations may be partly omitted insofar as features and effects described in the present application are retained and embodiments and modifications may be combined.

The present disclosure is not limited to the above embodiments and various modifications can be made. The present disclosure includes, for example, substantially the same configurations as configurations described in the embodiments. Substantially the same configurations are, for example, configurations identical in function, method, and result or configurations identical in object and effect. The present disclosure includes configurations obtained by replacing nonessential portions of configurations described in the embodiments. Furthermore, the present disclosure includes configurations capable of providing the same advantageous effects as those of configurations described in the embodiments or capable of achieving the same object. Furthermore, the present disclosure includes configurations obtained by adding a known technique to configurations described in the embodiments.

What is claimed is:

1. A fiber assembly-forming method comprising:
   providing a water-soluble resin to a first feedstock containing fibers;
   disintegrating the first feedstock after providing the water-soluble resin to the first feed stock, thereby forming disintegrated matter;
   depositing the disintegrated matter; and
   providing water to the deposited disintegrated matter.

2. The fiber assembly-forming method according to claim 1, wherein in the provision of the water-soluble resin, the water-soluble resin is provided to a surface of the first feedstock.

3. The fiber assembly-forming method according to claim 1, wherein the mass of the water provided in the provision of the water is one-hundredth times to 100 times the mass of the water-soluble resin provided in the provision of the water-soluble resin.

4. The fiber assembly-forming method according to claim 1, wherein the temperature of the water provided in the provision of the water is 40° C. to 200° C.

5. The fiber assembly-forming method according to claim 1, wherein in the formation of the disintegrated matter, the first feedstock provided with the water-soluble resin and a second feedstock unprovided with the water-soluble resin are disintegrated.

6. The fiber assembly-forming method according to claim 1, wherein the water-soluble resin has remoistening properties.

7. A fiber assembly-forming method comprising:
   preparing material containing fibers and a water-soluble resin;
   forming disintegrated matter by disintegrating the material after preparing the material;
   depositing the disintegrated matter; and
   providing water to the deposited disintegrated matter,
   wherein in the preparation of the material, the material is prepared such that the water-soluble resin accounts for 0.5% by mass or more of the fibers.

8. The fiber assembly-forming method according to claim 7, wherein in the preparation of the material, the material is prepared such that the water-soluble resin accounts for 3.5% by mass or more of the fibers.

9. The fiber assembly-forming method according to claim 7, wherein in the preparation of the material, the material contains a resinous substance made of the water-soluble resin.

* * * * *